United States Patent [19]
Itri

[11] Patent Number: 5,864,592
[45] Date of Patent: Jan. 26, 1999

[54] TIMING RECOVERY SYSTEM FOR DIGITAL SUBSCRIBER LINE TRANSCEIVERS

[75] Inventor: Benedict A. Itri, Huntington Beach, Calif.

[73] Assignee: PairGain Technologies, Inc., Tustin, Calif.

[21] Appl. No.: 970,816

[22] Filed: Nov. 3, 1992

[51] Int. Cl.[6] ....................................... H03D 3/24
[52] U.S. Cl. ........................................ 375/375; 375/220
[58] Field of Search ....................... 375/107, 108, 375/109, 354, 355, 358, 371, 375; 370/103, 105.2, 105, 112, 84, 503, 516, 517

[56] References Cited

U.S. PATENT DOCUMENTS

| | | |
|---|---|---|
| 4,214,128 | 7/1980 | Bovee et al. ............................ 370/112 |
| 4,494,211 | 1/1985 | Schwartz . |
| 4,514,760 | 4/1985 | Balabar et al. ........................... 370/84 |
| 5,048,061 | 9/1991 | Hubert ..................................... 375/109 |
| 5,062,124 | 10/1991 | Hayathi et al. .......................... 375/109 |

*Primary Examiner*—Don N. Vo
*Attorney, Agent, or Firm*—D'Alessandro & Ritchie

[57] ABSTRACT

A coordinated timing technique is disclosed which allows a single analog-to-digital converter (ADC) to be timeshared by multiple digital transceivers operating on independent subscriber loops with independent sampling phase requirements. The multiple transceivers must all operate from a single master reference clock. However, any arbitrary timing phase relationship between the transceivers can be accommodated.

16 Claims, 8 Drawing Sheets

TIMING RECOVERY SYSTEM FOR DIGITAL SUBSCRIBER LINE TRANSCEIVERS

FIELD OF THE INVENTION

This invention relates generally to digital subscriber line data transmission systems and more particularly to an improved timing recovery system for use therein.

BACKGROUND OF THE INVENTION

Modern subscriber line transceivers typically use digitally implemented signal processing hardware which requires expensive high resolution analog-to-digital converters (ADC's) having a large dynamic range. Furthermore, in order to accommodate high bit rate transmission over the relatively limited bandwidth of subscriber loops, a single high bit-rate data stream is often split into multiple lower rate streams and each such stream is transmitted down a separate twisted pair channel and combined at the far end to reconstruct the original signal. For example, in a High Bit-Rate Digital Subscriber Line (HDSL) system, a 1.544 Mbit/sec T-1 data stream is transmitted over two channels each operating at a rate of 784 Kbit/sec (772 Kbit/sec of T-1 data plus 12 Kbit/sec of overhead). As a result, two transceivers are normally required at each end of the subscriber loop thereby implying a need for four high resolution ADC's per subscriber.

More particularly, in a typical digital subscriber line application, transceivers are located at the central office (CO) and at a remote terminal (RT) in the subscriber premises. The master timing source for such a system is supplied by the central office and the RT transceivers derive their timing information from the received signal. Thus, the RT transceivers are slaved to the CO transceiver's timing reference. Timing recovery in the RT transceivers is typically performed by phase-locked loops which generate a local clock whose frequency is identical to the frequency of the transmitter's clock in the CO transceiver. For systems such as HDSL, which use two channels to deliver the T-1 data, there are two receivers at each end of the loop with independent clock recovery loops. After all transceivers acquire synchronization, their clock recovery phase-locked loops will generate clocks whose frequencies are all identical to the frequency of the CO master clock. However, their timing phases may be different to optimally detect the received signals. These timing phase differences result from the fact that the propagation delays of the signals down the twisted pair channels vary depending on the particular configuration. Thus, the optimal phase of the respective receiver clocks may be different.

Time sharing a single high sample rate ADC to digitize multiple analog signals is commonly used in instrumentation systems having large dynamic range requirements. In such systems, if N signals are to be digitized at a sampling rate of $F_S$ samples/sec, then these N signals are multiplexed into a single ADC operating at a sampling rate of $NF_S$ samples/sec The sampling interval $T=1/F_S$ is therefore subdivided into N equal subintervals and each of the N analog signals is sequentially sampled by the ADC during each subinterval. Although the effective sampling rate of each analog signal is $F_S$, there is a phase offset of $d=1/NF_S$ seconds between the samples in each channel. In other words, signal 1 will be sampled at times t=0,T,2T,3T, . . . , signal 2 will be sampled at times t=d, d+T,d+2T, d+3T, . . . , signal 3 will be sampled at times t=2d, 2d+T, 2d+2T, 2d+3T, . . . , and so forth. Since the phase at which each analog signal is sampled is unimportant in instrumentation systems, this technique is quite effective in reducing hardware complexity. However, such a multiplexing technique cannot be applied to digital subscriber line transceiver applications because it does not permit the sampling phases on the individual channels to be arbitrarily chosen. The optimal sampling phase for each received signal in an HDSL system must be independently determined, and even slight deviations from the optimum can significantly degrade receiver performance. As previously mentioned, in a typical HDSL system, all four transceivers are slaved to the same master clock and therefore all operate at the same frequency. However, to achieve optimum performance, the individual receiver sampling phases must be independently determined by separate clock recovery phase-locked loops inasmuch as two received signals at a common end of the loop could, in the worst case, require identical sampling phases. In such a situation, it would not be possible to use a single conventionally multiplexed ADC to sample both received signals simultaneously.

SUMMARY OF THE INVENTION

The present invention is directed to an improved timing recovery system which enables two or more receivers at one end of a digital subscriber loop to share a single ADC while still allowing optimal phasing of each receiver clock relative to its received signal.

In accordance with the invention, the respective receiver clocks generated at one end of the subscriber loop are phase offset by a fixed amount. Thus, as an example, in an N channel subscriber loop system, the receiver clocks respectively used by the N receivers at the loop remote end would be offset by 360°/N. Despite the fixed offset between the receiver clocks, optimal phasing is nevertheless achieved by controlling at least one of the transmitter clocks at the other end (i.e., central office (CO) end) of the subscriber loop to vary the phase of the signal transmitted therefrom.

In a preferred embodiment, a receiver's clock recovery phase-locked loop sends back control information to the other end of the subscriber loop to phase adjust a transmitter clock. In this manner, the transmitted signal can be optimally phased relative to a fixed receiver clock. Thus, in a typical two channel system, the two receivers at one end of a subscriber loop can timeshare a single ADC operating at twice the nominal sampling rate. This single ADC samples the received signals on the two channels with a fixed 180° offset between the two sampling phases. Thus channel 1 will be sampled at times t=0,T,2T,3T, . . . , and channel 2 will be sampled at times t=0.5T, 1.5T, 2.5T, 3.5T, . . . . Despite the fixed phase relationship between the receiver clocks on the two channels, the individual receivers are still both able to achieve optimal performance because of the system's ability to optimally phase the transmitted signal relative to a fixed receiver clock.

DETAILED DESCRIPTION

Figure 1:
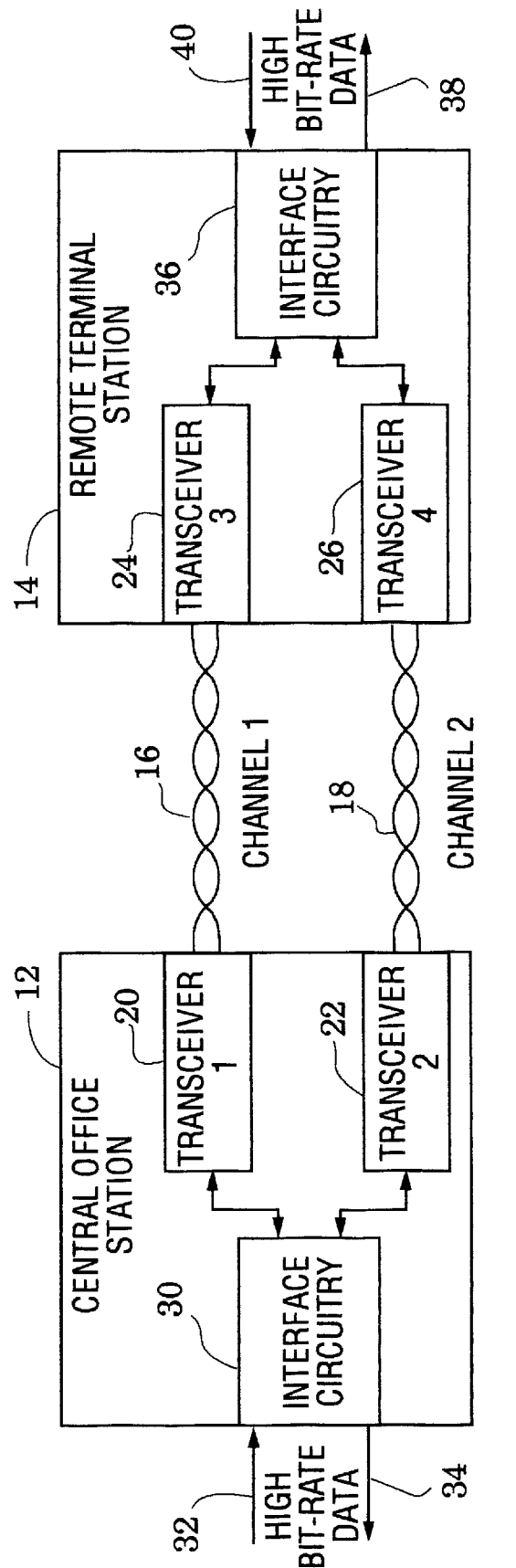
FIG. 1 is a block diagram depicting a prior art data transmission system operating over two twisted pair channels.

Attention is initially directed to FIG. 1 which comprises a block diagram of a typical prior art data full duplex transmission system for communicating data from a central office station 12 to a remote terminal station 14 via multiple loops or channels 16, 18. Although the channels can be implemented in many different forms, it will be assumed herein that they comprise twisted wire pairs, unless otherwise stated.

The central office station 12 includes first and second transceivers 20, 22 respectively connected to first ends of the channel media 16, 18. The remote terminal station 14 similarly includes third and fourth transceivers 24, 26 respectively connected to second ends of the channel media 16, 18.

As depicted in FIG. 1, transceivers 20, 22 are connected to interface circuitry 30 which bidirectionally transfers high bit rate data streams 32, 34 to local equipment (not shown). Similarly, transceivers 24, 26 of remote terminal station 14, are connected to interface circuitry 36 which sends and receives high bit rate data streams 38, 40.

Figure 2:
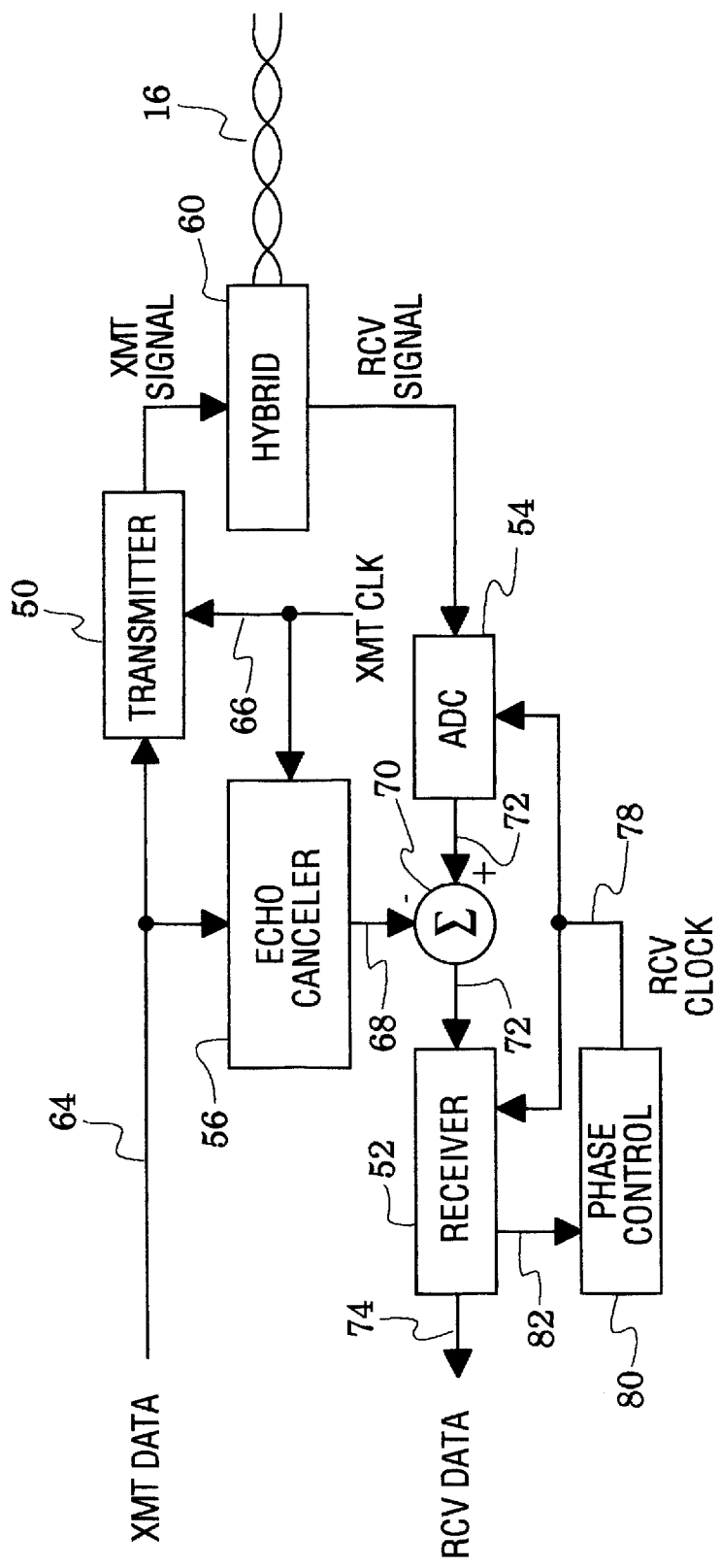
FIG. 2 is a block diagram depicting a prior art digital full-duplex transceiver incorporating an analog-to-digital (ADC) converter at the front end of the receiver.

FIG. 2 depicts a typical prior art transceiver which can be readily utilized in the system of FIG. 1. The transceiver of FIG. 2 is basically comprised of a transmitter 50, a receiver 52, an analog to digital converter (ADC) 54, and an echo canceler 56.

FIG. 2 further shows a conventional hybrid circuit 60 for coupling the transmitter 50 and ADC 54 to the twisted wire pair, e.g. 16. Data to be transmitted over the twisted wire pair 16 from transmitter 50 is supplied via input line 64 to both transmitter 50 and echo canceler 56. The transmitter 50 timing is controlled by an applied transmit clock (XMT CLK) signal 66 which establishes the relative phase of the transmitted signal. The echo canceler 56 functions in a well known manner to remove the echo of a transmitted signal from a received signal. More particularly, the output of the echo canceler 56 is applied via terminal 68 to a subtractive input of a summer 70. The output of the ADC 54 is supplied via terminal 72 to the additive input of summer 70. The output of summer 70 is applied via line 72 to the receiver 52 which produces the received data output signal on line 74.

As depicted in FIG. 2, the receiver 52 and ADC 54 are supplied with a receive clock timing signal (RCV CLK) on terminal 78 produced by clock recovery circuitry comprising phase control circuit 80 responsive to an output 82 of receiver 52. The phase control circuit 80 is connected in a phase lock loop and responds to a phase error detected on receiver output 82 to vary the phase of the RCV CLK to minimize the phase error. The use of phase lock loops employing phase control circuits 80 as depicted in FIG. 2 are well known in the data communications art for timing recovery.

Figure 3:
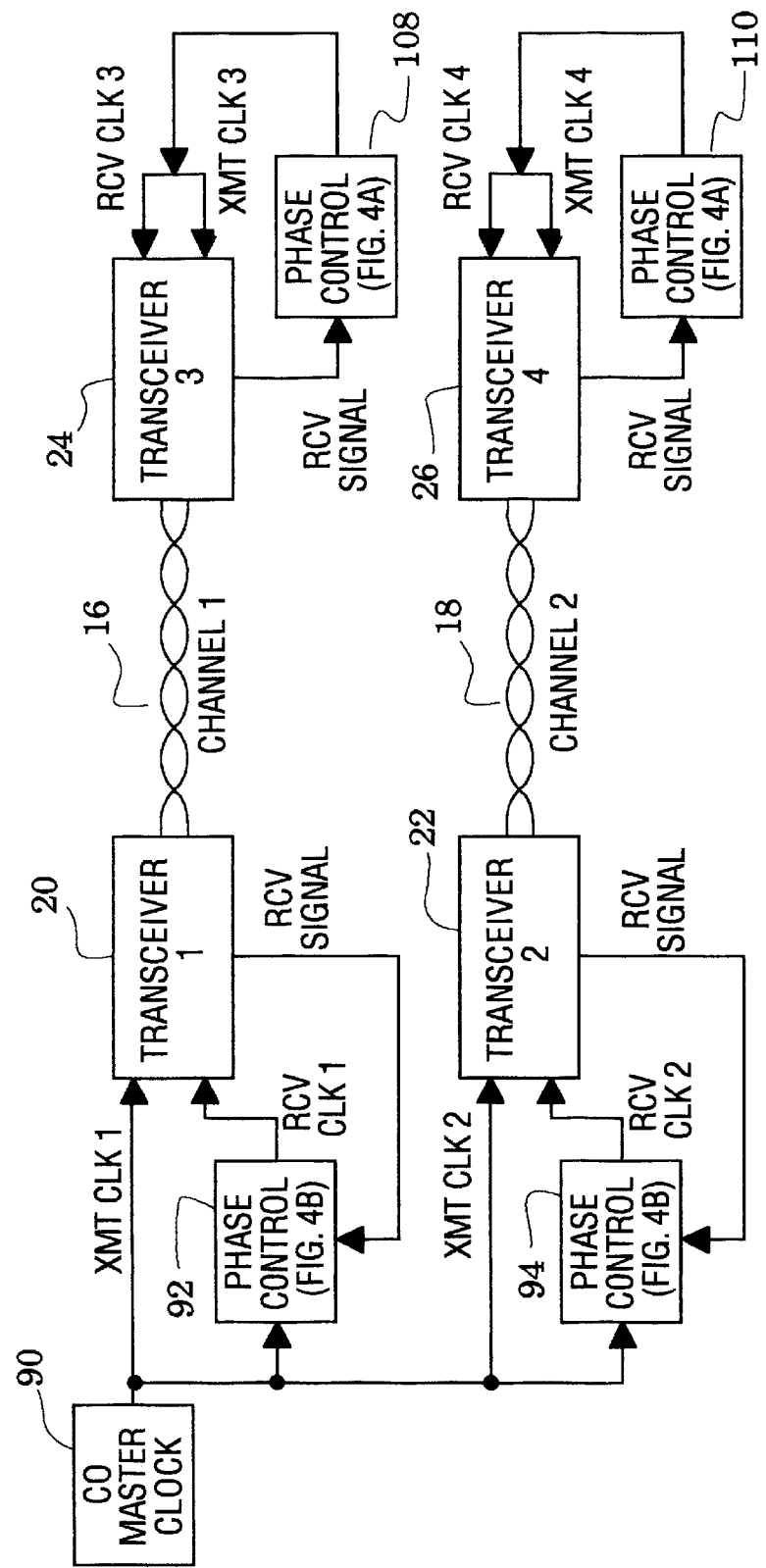
FIG. 3 is a block diagram depicting a typical prior art HDSL system in which the transmitter clocks are fixed and the receiver clocks are phase adjusted to optimize signal detection.

FIG. 3 depicts the data transmission system of FIG. 1 in greater detail showing how phase lock loops are typically employed in conjunction with each transceiver receiver to generate an optimally phased receive clock signal (RCV CLK). More particularly, note in FIG. 3 that a central office master clock source 90 supplies a master clock signal to the phase control circuits 92, 94 associated with the first and second transceivers 20, 22. The circuits 92, 94 respectively produce RCV CLK 1 and RCV CLK 2. FIG. 4B illustrates a block diagram of a typical central office phase control circuit, i.e. 92 or 94.

The phase control circuit of FIG. 4B is comprised of a phase error detector 96 which has as its input a receive signal from its associated receiver. The output of the phase error detector 96 is applied to a loop filter 98 whose output is coupled to a phase adjust circuit 100. The master clock from source 90 is applied as an input 102 to the phase adjust circuit 100. The circuit 100 then produces a receive clock signal (RCV CLK) on output 104, whose phase can vary from that of the master clock 102, depending upon the phase error indicated by the receive signal applied to the detector.

The remote terminal transceivers 24, 26 respectively have phase control circuits 108, 110 connected to their receivers (FIG. 3). The function of the phase control circuits 108, 110 is to recover an optimally phased receive clock (RCV CLK) from the signals received respectively at the second ends of channels 1 and 2.

Figure 4A:
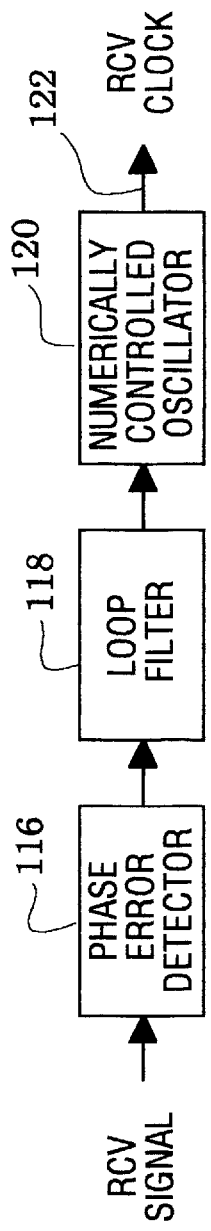
FIG. 4A is a block diagram depicting a prior art clock recovery means typically used in a phase-locked loop at the remote (RT) end of a subscriber loop.
Figure 4B:
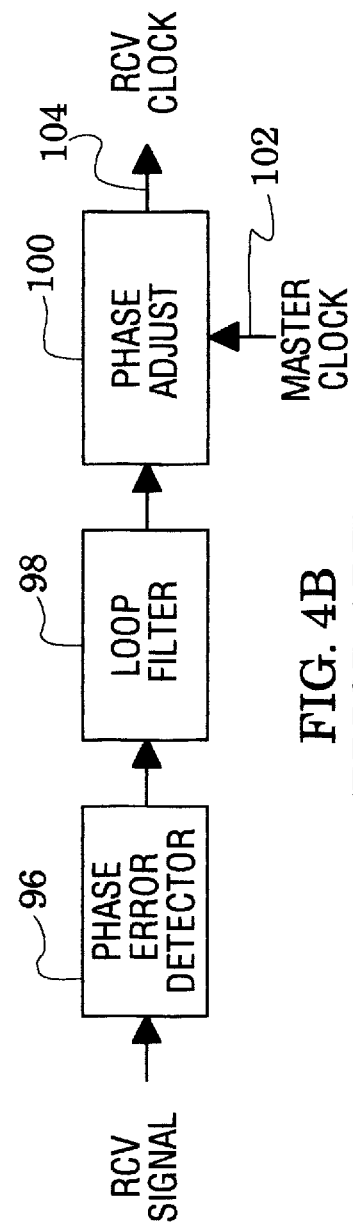
FIG. 4B is a block diagram depicting a prior art clock recovery means typically used in a phase-locked loop at the central office (CO) end of a subscriber loop.

An exemplary block diagram of the phase control circuits 108, 110 is depicted in FIG. 4A. This remote terminal phase control circuit is comprised of a phase error detector 116 whose input comprises a receive signal derived from its associated transceiver receiver. The output of the phase error detector 116 is applied to a loop filter 118, whose output in turn is applied to a numerically controlled oscillator 120. The numerically controlled oscillator 120 should be considered as a specific type of phase adjust circuit whose function is analogous to the phase adjust circuit 100 of FIG. 4B. That is, whereas the circuit 100 of FIG. 4B adjusted the phase of master clock 102 as a function of a detected phase error to produce RCV CLK 104, the oscillator 120 generates a RCV CLK 122 whose phase similarly depends upon the phase error detected by detector 116.

In the conventional operation of the system of FIG. 3, synchronization is accomplished in the following manner. XMT CLK 1 is slaved to the master clock. The phase locked loop of transceiver 3 acquires synchronization with XMT CLK 1 and adjusts its phase to the optimal sampling point to produce RCV CLK 3. XMT CLK 3 is slaved to RCV CLK 3. RCV CLK 1 is generated by adjusting the phase of the master clock as determined by the phase error detector in the phase control circuit 92. Similarly, XMT CLK 2 is slaved to the master clock. RCV CLK 4 is recovered by the transceiver 4 phase lock loop and adjusts its phase to the optimal sampling point with respect to XMT CLK 2 to produce RCV CLK 4. XMT CLK 4 is slaved to RCV CLK 4. RCV CLK 2 is generated by phase control circuit 94 by adjusting the phase of the master clock as determined by the phase error detector in circuit 94. Thus, transceivers 2 and 4 operate substantially identically to transceivers 1 and 3 to acquire synchronization. After synchronization is acquired, all eight clocks (i.e., XMT CLK 1–4 and RCV CLK 1–4) will have identical frequencies but their phases will in general be different, having been optimized with respect to signals received by the transceivers via the twisted pair channels. Because, in a worst case condition, two transceivers at the same station may require identically phased receive clocks, a single ADC cannot be conventionally timeshared by the transceivers. That is, conventional timesharing of an ADC would assign alternate time slots to the transceivers at a common station, e.g. transceivers 3 and 4. Such a conventionally timeshared technique would prevent optimized phasing of RCV CLK 3 and 4 which, under certain conditions, might have to occur simultaneously.

Figure 5:
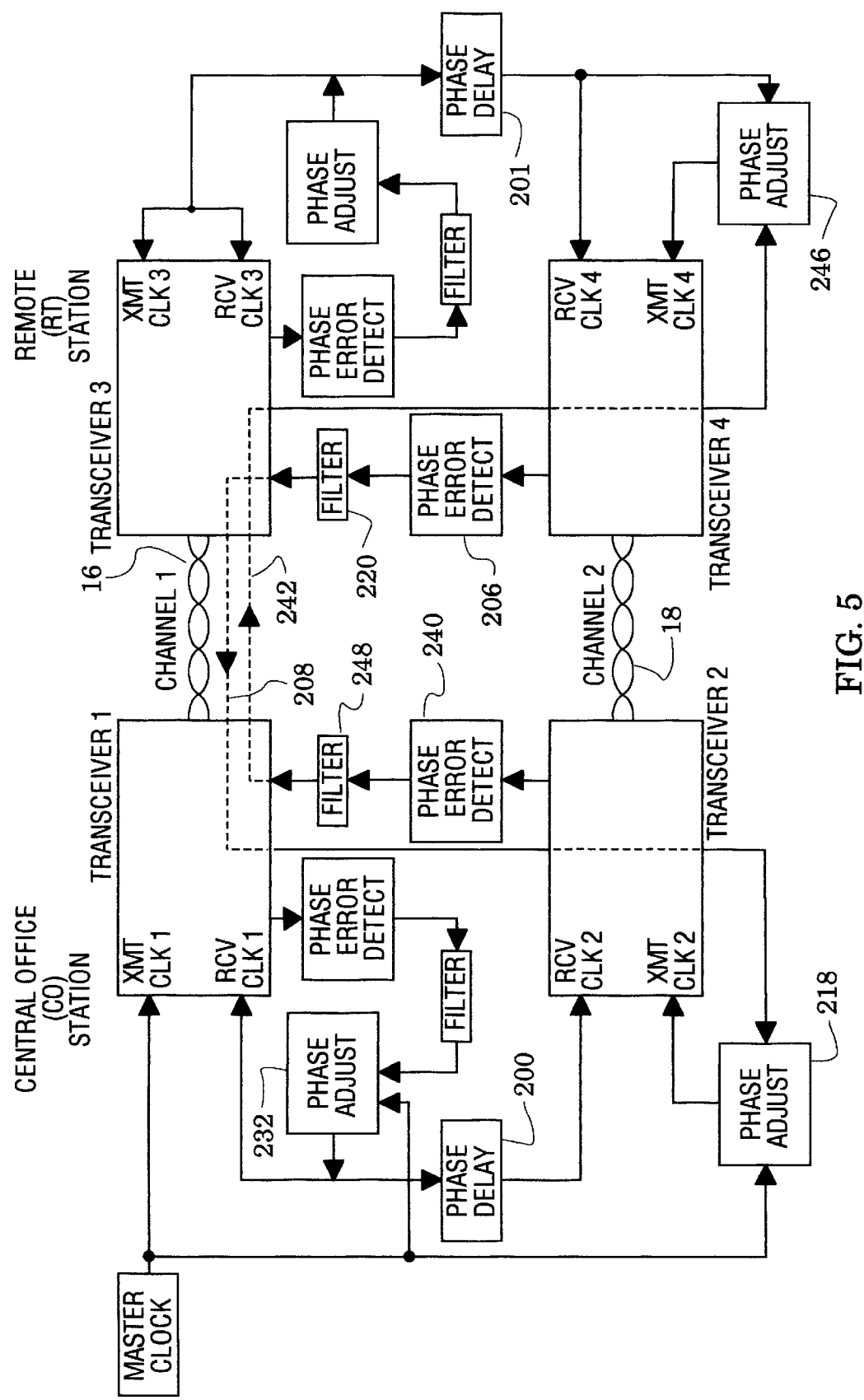
FIG. 5 is a block diagram depicting a system in accordance with the invention wherein the receiver clocks are fixed in phase relative to one another and the transmitter clock phases are adjusted to optimize signal detection.

Attention is now directed to FIG. 5 which depicts a block diagram of a system in accordance with the present invention which permits timesharing a single ADC and which, nevertheless, allows for optimal phasing of the receive clocks relative to their associated received signals.

In order to facilitate an explanation of the invention, FIG. 5 illustrates the primary components of the clock recovery phase control circuits, i.e., phase error detector, filter, and phase adjust circuit.

In contrasting the system in accordance with the invention (FIG. 5) with the prior art system of FIG. 3, it is initially pointed out that RCV CLK 2 and RCV CLK 4 in FIG. 5 are produced by respective phase delay circuits 200, 201 responding to RCV CLK 1 and RCV CLK 3. In accordance with the preferred embodiment, the phase delay circuits 200, 201 introduce a phase delay equal to 360°/N where N represents the number of channels. Thus, assuming the depicted two channel system, RCV CLK 2 and RCV CLK 4 will, respectively, be 180° out of phase with RCV CLK 1 and RCV CLK 3.

Phase error detector 206 connected to transceiver 4 detects the phase error between RCV CLK 4 and the signal received by transceiver receiver 4 via channel 2. As depicted in FIG. 5, a command signal (depicted by dashed line 208) representing the phase error detected by detector 206, is communicated via transceiver 3 transmitter over channel 1 (preferably within a frame overhead field) to phase adjust circuit 218 (connected to transceiver 2) via filter 220. The phase error causes the circuit 218 to adjust the phase of the master clock to produce XMT CLK 2. By so adjusting the phase of the transmit clock, the phase error between RCV CLK 4 and the signal received by transceiver 4 via channel 2, will be minimized. Thus, the phase error detector 206, in combination with phase adjuster circuit 218, and the transceiver 2 transmitter form a phase locked loop to minimize the phase error between RCV CLK 4 and the signal received by transceiver receiver 4.

Similarly, phase error detector 240 connected to the transceiver 2 receiver sends a phase error control signal via transceiver 1 over channel 1 (depicted by dashed line 242) to phase adjust circuit 246 via filter 248. Phase adjust circuit 246 responds to the phase error input to produce XMT CLK 4 by adjusting the phase of RCV CLK 4. By adjusting the phase of XMT CLK 4, the signal received by transceiver 2, can be optimally phased relative to RCV CLK 2.

In operation of the system of FIG. 5, during initial start up of the system, transceiver 1 and transceiver 3 acquire synchronization in the conventional manner as aforedescribed. XMT CLK 1 is slaved to the master clock. Transceiver 3's phase locked loop acquires synchronization with XMT CLK 1 and adjusts its RCV CLK 3 to the optimal sampling point. XMT CLK 3 is slaved to RCV CLK 3 and RCV CLK 1 is generated by phase adjust circuit 232 adjusting the phase of the master clock, as determined by the phase error detector in transceiver 1's phase lock loop.

After transceivers 1 and 3 acquire synchronization on channel 1, then transceivers 2 and 4 begin their synchronization cycle on channel 2. XMT CLK 2 is initially slaved to the master clock. RCV CLK 4 is fixed by the phase delay circuit 201, i.e. 180° out of phase with RCV CLK 3. XMT CLK 4 is initially slaved to RCV CLK 4, as in the aforedescribed prior art approach.

RCV CLK 2 is fixed relative to RCV CLK 1 by phase delay circuit 200. Phase error detectors 206 and 240 detect the phase errors associated with transceiver 4 and transceiver 2, respectively. When transceiver 2 wishes to advance or retard the phase of a received signal, a command is sent by transceiver transmitter 1, via channel 1, to transceiver 3 and then to transceiver 4 via phase adjust circuit 246 to advance or retard XMT CLK 4. Similarly, when transceiver 4 wishes to advance or retard the phase of a received signal, a phase error command is sent by transceiver 3 to transceiver 1 and is then coupled to transceiver 2 phase adjust circuit 218. As mentioned, these phase advance and retard commands produced by phase error detectors 206 and 240 are communicated via channel 1 in the frame overhead field of transceivers 1 and 3. This overhead channel is always available to transceivers 2 and 4 because transceivers 1 and 3 acquire synchronization first and establish a reliable communications link prior to transceivers 2 and 4 beginning their synchronization.

Figure 6:
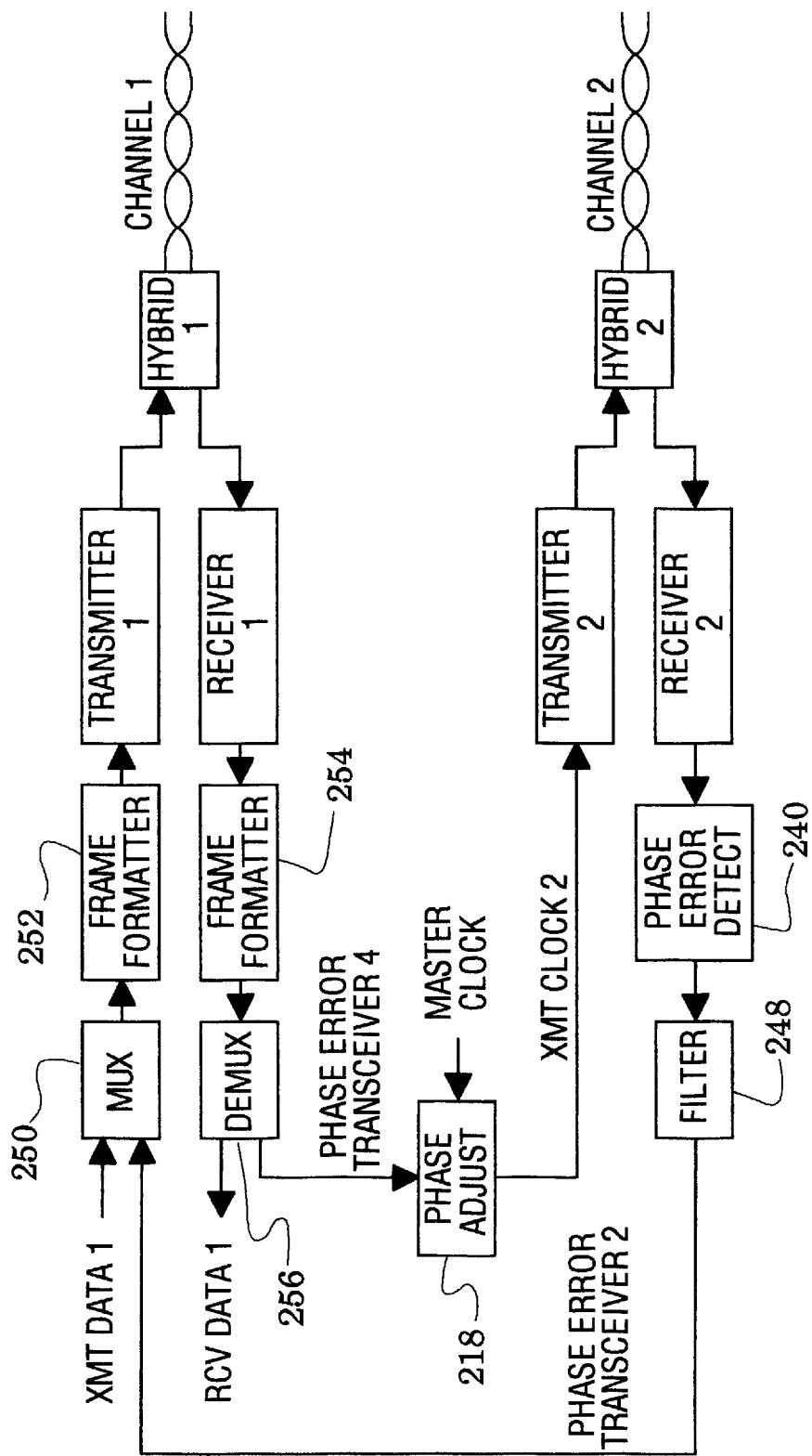
FIG. 6 is a block diagram depicting transmission and reception of phase error commands for adjusting transmitter clock phases in accordance with the invention.

The block diagram of FIG. 6 illustrates details of the transmission and reception of phase error commands over channel 1. The phase error associated with transceiver 2 and produced by phase error detector 240 is sent via filter 248 to be multiplexed into the transmit data line by signal multiplexor 250. The phase error is then time multiplexed by a frame formatter 252 for transmission via transmitter 1 over channel 1. Phase errors associated with transceiver 4 are received by receiver 1 over channel 1 and then time demultiplexed by frame formatter 254 and routed to phase adjuster 218 by signal demultiplexor 256. Similar transmission and reception circuits are associated with transceivers 3 and 4.

Figure 7:
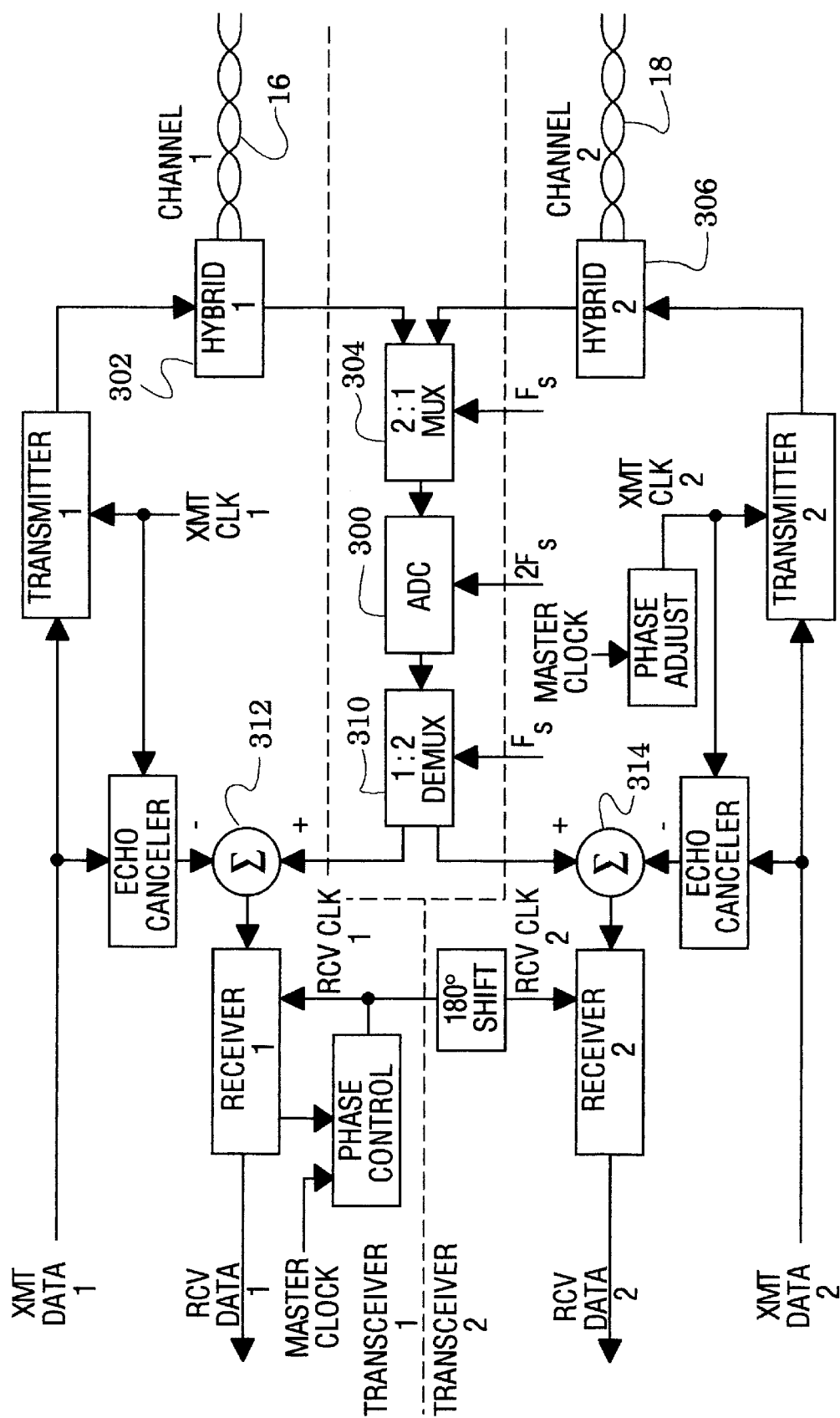
FIG. 7 is a block diagram depicting how a single ADC is timeshared by two receivers in accordance with the present invention.

As a consequence of being able to optimally phase the two receive clocks at a station while assuring that the receive clocks do not occur simultaneously, a single analog to digital converter (ADC) can be timeshared between multiple transceivers. More particularly, attention is called to FIG. 7 which illustrates how a single ADC 300 can be timeshared between transceivers 1 and 2. Note that the outputs of transceiver 1 hybrid 302 is connected to one input of multiplexor 304. The output of transceiver 2 hybrid 306 is similarly connected to the input of multiplexor 304. The output of multiplexor 304 is applied to the input of converter 300 whose output is in turn applied to the input of multiplexor 310. The two outputs of demultiplexor 310 are respectively coupled to transceiver 1 summer 312 and transceiver 2 summer 314.

Figure 8:
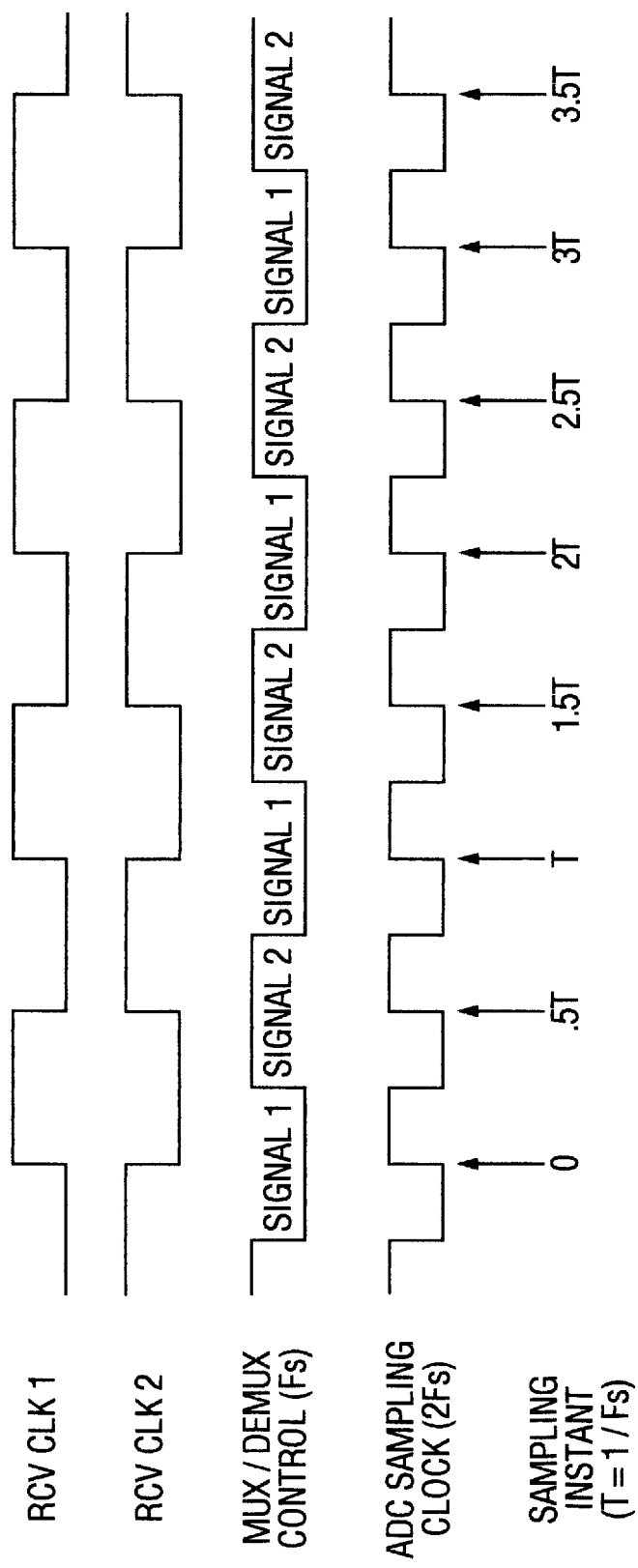
FIG. 8 is a timing diagram applicable to FIG. 7.

The multiplexor 304 and the demultiplexor 310 are switched by a control signal $F_S$ whose waveform is depicted in FIG. 8. The ADC sampling clock $2F_S$ is likewise depicted in FIG. 8. RCV CLK 1 and RCV CLK 2, developed as previously described in connection with FIG. 5, are also depicted in FIG. 8 and define sampling points at T=0, 0.5T, 1.0T, 1.5T, 2.0T, etc., where T equals $1/F_S$.

From the foregoing, it should now be appreciated that an improved timing recovery system has been disclosed herein particularly suited for use in a digital subscriber line data transmission system which enables two or more receivers at one end of a subscriber loop to share a single analog to digital converter, while still allowing optimal phasing of each receiver clock relative to its received signal.

I claim:

1. A system for bidirectionally communicating data signals via first and second channel media where each channel medium is connected between a different pair of first and second transceivers, said first transceivers being located at a first station and said second transceivers being located at a second station, said system comprising;

master clock generator means for applying a transmit clock to said first transceiver of said first channel medium;

clock recovery means connected to said second transceiver of said first channel medium and responsive to a data signal received via said first channel medium for applying a receive clock to said second transceiver of said first channel medium;

phase delay means for applying a receive clock to said second transceiver of said second channel medium delayed from said receive clock of said second transceiver of said first channel medium;

detector means for detecting a phase error between said delayed receive clock applied to said second transceiver of said second channel medium and a data signal received thereby via said second channel medium; and means responsive to said detected phase error for adjusting the phase of a transmit clock applied to said first transceiver of said second channel medium to minimize said detected phase error.

2. The system of claim 1 further comprising means for communicating said detected phase error via said first channel medium to said first transceiver of said second channel medium.

3. A system for bidirectionally communicating data signals between first and second spaced stations via two or more channel media, said system comprising:

first and second transceivers at said first station respectively connected to first ends of first and second channel media;

third and fourth transceivers at said second station respectively connected to second ends of said first and second channel media;

each of said transceivers including a transmitter and a receiver;

means for applying respective periodic transmit clock signals to said transmitters;

means for applying respective periodic receive clock signals to said receivers wherein said receive clock of said first transceiver is phase offset from said receive clock of said second transceiver;

fourth detector means connected to the receiver of said fourth transceiver for detecting a phase error between said receive clock signal applied thereto and a data signal received thereby via said second channel medium; and means for adjusting the phase of said transmit clock signal applied to said transmitter of said second transceiver in response to said phase error detected by said fourth detector means.

4. The system of claim 3 wherein said means for applying transmit clock signals includes a master clock generator for applying a master clock signal to said transmitter of said first transceiver.

5. The system of claim 4 wherein said means for applying receive clock signals includes:

third detector means connected to said receiver of said third transceiver for detecting a phase error between said receive clock signal applied thereto and a data signal received thereby via said first channel medium; and means for adjusting the phase of said receive clock signal applied to said receiver of said third transceiver in response to said phase error detected by said third detector means.

6. The system of claim 5 wherein said means for applying receive clock signals further includes:

means for phase delaying said receive clock signal applied to the receiver of said third transceiver to produce said receive clock signal applied to said receiver of said fourth transceiver.

7. The system of claim 3 wherein said means for adjusting the phase of said transmit clock signal applied to said transmitter of said second transceiver further includes means for communicating said detected phase error from said fourth detector means to said adjustment means via said first channel medium.

8. The system of claim 7 wherein said means for communicating said phase error via said first channel medium includes:

means for causing said transmitter of said third transceiver to transmit a signal representative of said phase error via said first channel medium.

9. The system of claim 3 further including:

an analog to digital converter located at said first station;

multiplexer means at said first station for alternately applying data signals received from said first and second channel media to the input of said analog to digital converter; and demultiplexer means for alternately applying the output of said analog to digital converter to the receivers of said first and second transceivers.

10. The system of claim 3 further including:

second detector means connected to said receiver of said second transceiver for detecting a phase error between said receive clock signal applied thereto and a data signal received thereby via said second channel medium; and means for adjusting the phase of said transmit clock signal applied to the transmitter of said fourth transceiver in response to said phase error detected by said second detector means.

11. A system for bidirectionally communicating data signals between first and second spaced stations via two or more channel media, said system comprising:

first and second transceivers at said first station respectively connected to first ends of first and second channel media;

third and fourth transceivers at said second station respectively connected to second ends of said first and second channel media;

each of said transceivers including a transmitter having a timing input terminal and a receiver having a timing input terminal;

master clock means at said first station for producing a periodic master clock signal;

means for applying said master clock signal to said transmitter timing input terminal of said first transceiver;

clock recovery means connected to said receiver of said third transceiver for producing a third receive clock signal in response to a data signal received at said first channel medium second end;

means for applying said third receive clock signal to said receiver timing input terminal of said third transceiver;

means for producing a fourth receive clock signal phase displaced from said third receive clock signal;

means for applying said fourth receive clock signal to the receiver timing input terminal of said fourth transceiver;

detector means connected to said receiver of said fourth transceiver for detecting a phase error between said fourth receive clock signal and a data signal received at said second channel medium second end;

means for producing a second transmit clock signal whose phase is a function of said master clock signal and said detected phase error; and means for applying said second transmit clock signal to said transmitter timing input terminal of said second transceiver.

12. The system of claim 11 further comprising means for communicating said detected phase error via said first channel medium to said means for producing said second transmit clock signal.

13. The system of claim 12 wherein said communicating means includes means for applying a signal representative of said detected phase error to said transmitter of said third transceiver for transmission via said first channel medium to said receiver of said first transceiver.

14. The system of claim 11 further including:

an analog to digital converter located at said first station;

multiplexer means at said first station for alternately applying data signals received from said first and second channel media to the input of said analog to digital converter; and demultiplexer means for alternately applying the output of said analog to digital converter to said receivers of said first and second transceivers.

15. In a system for bidirectionally communicating data signals via first and second channel media where each channel medium is connected between a different pair of first and second transceivers, each transceiver including a transmitter and a receiver and wherein said first transceivers are located at a first station and said second transceivers are located at a second station, a method of applying receive clocks to each receiver synchronized with the data signal received by that receiver, while still assuring that receive clocks at the same station do not occur simultaneously with the same phase, said method comprising;

applying receive clocks to said second station receivers which are phase offset from one another;

detecting the phase error between the receive clock applied to said receiver of said transceiver of said second channel medium and the data signal received thereby; and adjusting the phase of a transmit clock applied to said first transceiver of said second channel medium in response to said detected phase error to minimize said phase error.

16. The method of claim 15 including the further step of communicating said detected phase error from said second station to said first station via said first channel medium for adjusting the phase of said transmit clock of said first transceiver of said second channel medium.

* * * * *